April 9, 1968   J. B. WHITLEY ET AL   3,376,782
OPTICAL VIEWER WITH MEANS FOR COMPARING DUAL IMAGES
Filed Jan. 11, 1966   2 Sheets-Sheet 1
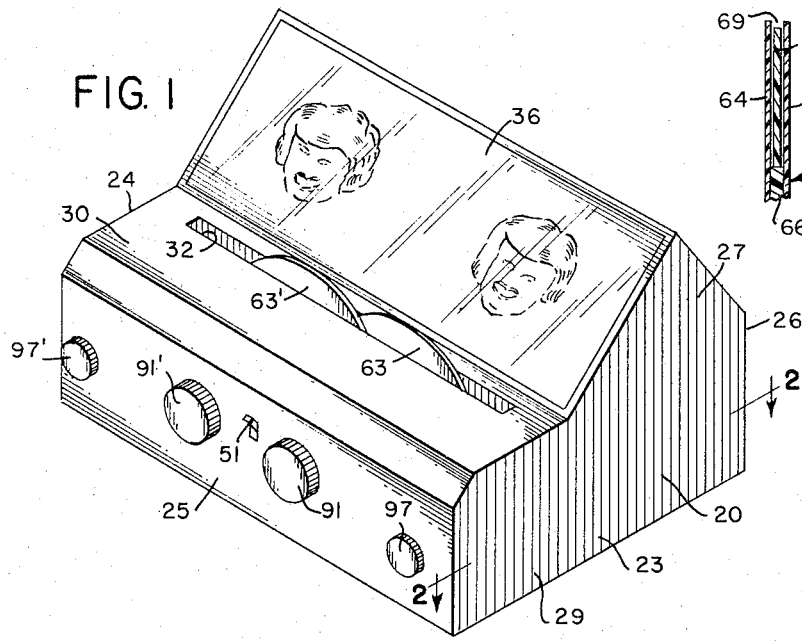
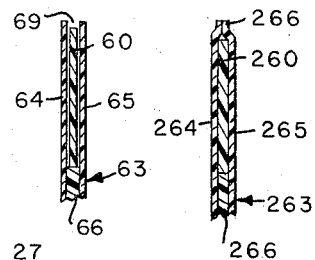
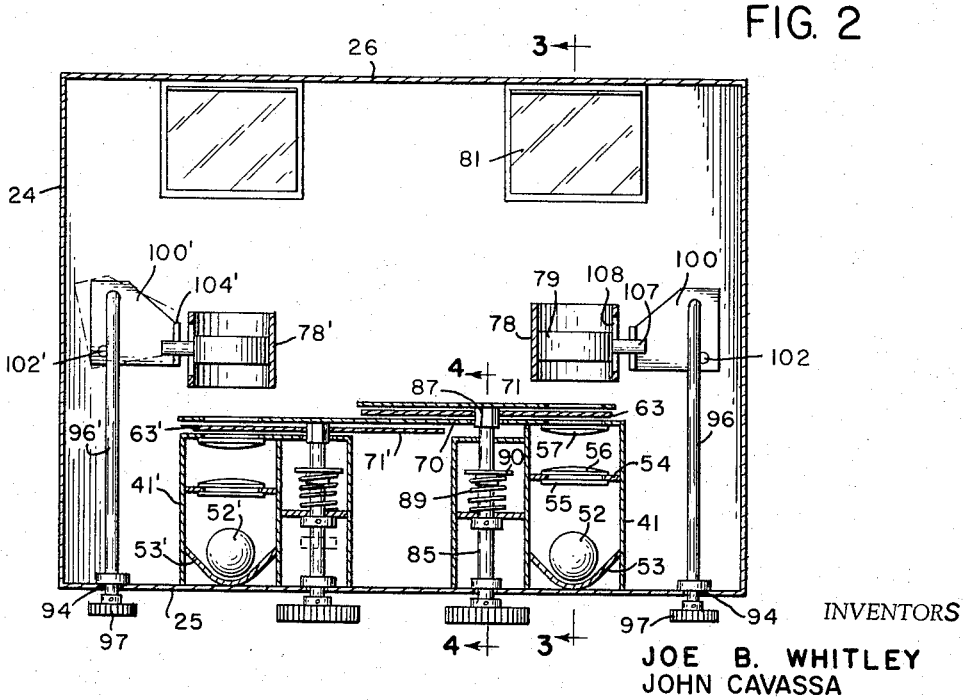
INVENTORS
JOE B. WHITLEY
JOHN CAVASSA
BY *Yates Dowell & Yates Dowell Jr.*
ATTORNEYS April 9, 1968 J. B. WHITLEY ET AL 3,376,782
OPTICAL VIEWER WITH MEANS FOR COMPARING DUAL IMAGES
Filed Jan. 11, 1966 2 Sheets-Sheet 2

INVENTORS
JOE B. WHITLEY
JOHN CAVASSA

BY
ATTORNEYS

United States Patent Office
3,376,782
Patented Apr. 9, 1968

3,376,782
OPTICAL VIEWER WITH MEANS FOR
COMPARING DUAL IMAGES
Joe B. Whitley, 433 Star St., and John Cavassa, 318
Center St., both of Hereford, Tex. 79045
Filed Jan. 11, 1966, Ser. No. 519,839
8 Claims. (Cl. 88—24)

ABSTRACT OF THE DISCLOSURE

A cabinet having a screen on which two side by side images of transparent picture slides can be projected for the purpose of comparing details of the one slide with the other and having two slide projectors therein, a slide carrier for carrying a set of slides associated with each projector, and an independently operable slide selector associated with each carrier so that any slide of one set can be viewed at the same time as any slide in any other set.

---

This invention relates to transparency picture slide viewers and more particularly to a viewer for projecting side by side images of two such slides.

While the invention has broad uses, it has been particularly designed with the needs of the dental profession in mind. In recent years more lifelike dentures and plastic crowns for overlying teeth having excessive defects, such as stains, have been developed. The production of such improved dentures and crowns may involve greater expense than that for earlier types. Unless the patient can compare the results with both types he may not appreciate the desirability of having the more recently developed types. Laymen generally speaking cannot identify the more natural dentures. However, they can readily recognize the improved over-all facial appearance when they see a picture of a person wearing the improved dentures side by side with a picture of the same person wearing the prior art dentures. In addition such a side by side slide viewer is useful for comparing X-rays of defective teeth with sound teeth, as an instructural device for the dentist to educate his patients, and for his own study of newly developed professional techniques which often involve minute changes which can only be appreciated by viewing side by side pictures.

Because of the limited space in a dental office, particularly near a patient's chair, such a side by side viewer must be compact. In addition it is not desirable to use screen type projectors requiring darkened rooms since the desired person to person contact cannot be maintained, nor can other activities requiring the use of vision be carried on at the same time.

Among the objects of this invention are the provision of a compact transparency dual slide projector for projecting from each a plurality of images side by side on the same screen in a lighted room whereby a comparison of the two images can take place, which is compact in size, easy to use, and has high optical qualities, and in which the slides are rigidly held in a disk-type carrier.

Figure 3:
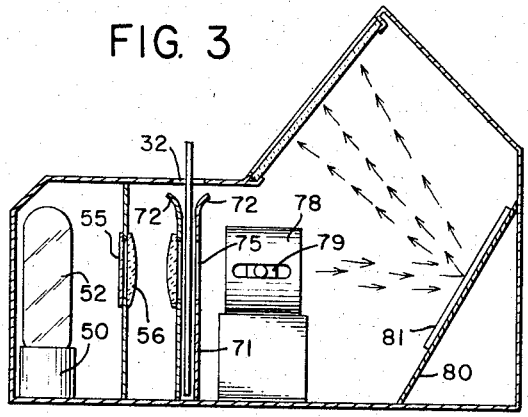
Figure 6:
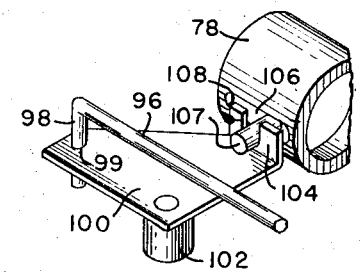
Figure 4:
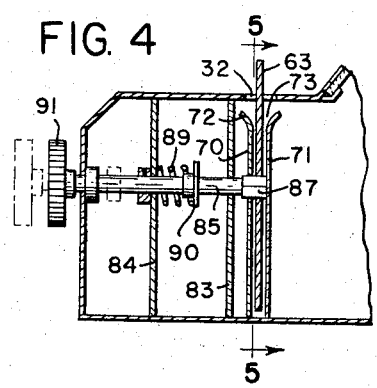
Figure 5:
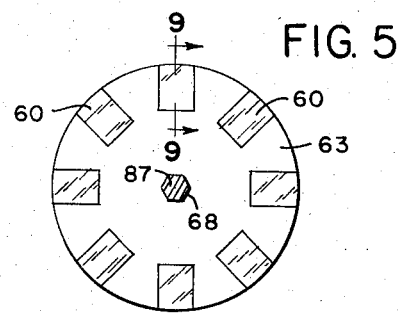
Figure 7:
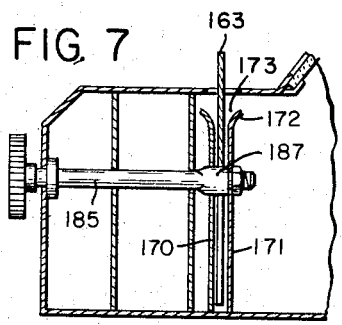
Figure 8:
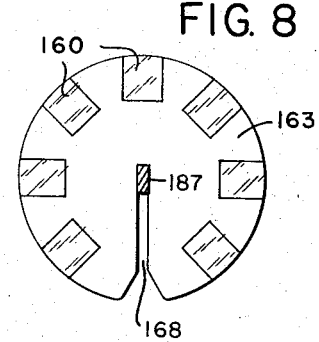

Other objects and advantages of the invention will be apparent from the following description taken in conjunction with the accompanying drawings in which:

FIG. 1 is a perspective of a slide viewer according to the present invention;
FIG. 2, a sectional view on the line 2—2 of FIG. 1;
FIG. 3, a sectional view on the line 3—3 of FIG. 2;
FIG. 4, a sectional view on the line 4—4 of FIG. 2;
FIG. 5, a fragmentary sectional view on the line 5—5 of FIG. 4 illustrating a slide carrier of the present invention;
FIG. 6, a fragmentary perspective view of the rocker member of the slide viewer of FIG. 1;

FIG. 7, a sectional view similar to FIG. 4 illustrating another form of the invention;
FIG. 8, a sectional view similar to FIG. 5 illustrating a slide carrier according to another form of the invention;
FIG. 9, a sectional view on the line 9—9 of FIG. 5;
FIG. 10, a sectional view similar to FIG. 9 illustrating a slide carrier according to still another form of the invention.

Briefly stated, in accomplishing the objects desired, two slide projectors are mounted within a cabinet having a ground glass viewing screen in its upper front wall. Each slide projector includes a light bulb with a reflector behind it and a pair of non-symmetrical condensing lenses in front of it which direct a beam of light in a path through a transparency picture slide and a projecting lens to a mirror which reflects the light beam and the image of the slide onto the screen beside the image projected by the other slide projector. Slides are mounted in a novel carrier disk which is engaged and turned by a shaft. The slide-carrying disks are positioned in a guide slot formed by two spaced parallel walls having outwardly flared tops. The walls are so arranged that one slide carrier disk passes behind the carrier and walls of the other slide carrier disk. This permits the cabinet to be more compact since the projectors are closer to each other, but the slide carrier disks do not interfere with each other. The projecting lens is moved back and forth in the light beam path to focus the image by a novel mechanism including a pivoted rocker member, one portion of which engages and moves the lens during its pivotal movement. The rocker member is pivoted by an arm attached to a rotatable shaft which is substantially parallel to the light beam path.

With further reference to the drawings, the side by side slide viewer of the present invention includes a cabinet 20 formed with a base 22, side walls 23, 24, a front wall 25 and a rear wall 26. Each side wall is formed with an upper rear portion 27 of trapezoidal shape, and a lower rectangular portion 29. The top of the cabinet is closed by a forward deck plate 30 having a slide receiving slot 32 therein, which joins the upper edges 33 of the lower side wall portions 29. A frosted glass screen 36 is mounted between the forward edge 37 of the side wall upper portions 27 and a top plate 39 joins the upper edges 40 of the side wall upper portions.

Two slide projectors 41 and 41' are mounted in the lower portions of cabinet 20. These projectors are substantially identical with one exception hereafter described, and the parts which form projector 41 alone are described. For each part of projector 41 described hereafter projector 41' has a corresponding part designated by the same numeral primed. Base plate 29 carries a lamp base socket 50, having a projection bulb 52 mounted therein. A switch 51 mounted on the cabinet's front wall 25 is electrically connected to control power flow to both projection bulbs 52 and 52'. A reflector 53 is fixed between front wall 25 and bulb 52. Bracket 54 carries heat-absorbing glass 55 and the first condensing lens 56 of a pair of non-symmetrical condensing lenses 56 and 57.

Transparency picture slides 60 are mounted in a carrier disk 63 formed of two transparent plastic sheets 64, 65 and spaced by a circular spaced member 66 having rectangular openings 67 arranged about its periphery. Openings 67 are slightly larger than slides 60. Transparent plastic sheets 64, 65 are secured to the spacer member so as to form pockets into which slides as desired may be inserted. FIG. 10 illustrates another form of the invention, in which the slide carrier 263 has plastic sheets 264 and 265, heat sealed about their outer edges 266 to enclose slides 260 therein. Such a laminated disk might be used to market a prepared set of slides, for example, those illustrating an instructional course in dentistry.

Slide carrier 63 has a central opening 68 therein of hexagonal shape. Slide carrier 63 is inserted through slide receiving slot 32 in forward deck plate 30 which is directly above another guide slot 73 formed by a pair of parallel vertical slide carrier guide plates 70, 71. The guide plates have their upper portions 72 bent outwardly from the center of slot 73 to make a flared opening. The elements of each of the two slide projectors in the cabinet are identical except that the slide carrier plates are staggered so that a portion of slide carrier 63 passes behind slide carrier 63′. This is accomplished by making guide plate 70 a continuous member which serves as a front guide plate with guide plate 71 and as a read guide plate with guide plate 71′. These guide plates have openings 75 therein in front of the associated condensing lens pairs 56 and 57 and 56′ and 57′.

A cylindrical projection lens 79, the optical axis of which is aligned with the optical axis of condensing lenses 56 and 57, is slidably mounted in a generally cylindrical bracket 78 fixed in front of the openings 75. The rear of the cabinet carries a diagonal bracket 80 having mounted thereon a front surface mirror 81, that is, one which is coated on its front surface so as to reflect light directly from this surface rather than from its rear surface. The front surface mirror is mounted along the optical axis of the condenser and projection lenses and is arranged to reflect light to the frosted screen 36.

Satisfactory optical apparatus has been purchased from the Edmund Scientific Company of Barrington, N.J. The various parts used have the indicated stock numbers in this company's catalog No. 655. Reflector 53 is a metal concave reflector, diameter 1⅜″, stock number 566. The condensing lenses 56 and 57 have a diameter of 2″ and a focal length of 3″, stock number 4034. Heat-absorbing glass 55 is 2″ in diameter ⅛″ thick, stock number 40,206. Projection lens 79 is a Cooke triplet projection lens, focal length 50 mm., f/3.5, diameter ¾ of an inch, length 25/32, stock number 40,423. Front surface mirror 81 is 3″ x 4″ by ¼″ thick, stock number 40,041. These parts as arranged in the slide viewer built by applicants give a seven-fold magnification of 35 mm. slides.

Brackets 83, 84 and cabinet front wall 25 have aligned openings (unnumbered) carrying a slide turning shaft 85 arranged to rotate about an axis substantially parallel to the optical axes of the condenser and projector lenses. The end 87 of the shaft is of hexagonal shape of substantially the same size as the slide carrier central opening 68. The shaft is slidably mounted so that it can be pulled out of the slot 73 between the guide plates to permit insertion of the slide carrier 63 into the slot. A spring 89 acts against a shoulder 90 on shaft 85 and bracket 84 to bias shaft 85 back across the slot 73 to push the hexagonally shaped end 87 of the shaft into the slide carrier's mating central opening 68. A knob 91 on the outer end of the shaft 85 on the outside of front wall 25 of the cabinet permits rotation of the slide carrier 63 to bring a desired slide into alignment with the light beam projected by the condensing lenses.

Front wall 25 has an opening 94, which carries a focusing shaft 96 mounted for rotation about an axis parallel to the optical axis of the condenser and the projector lenses. A focusing knob 97 is mounted on the shaft front end and its other end 98 is bent downwardly and passed through an opening 99 in a triangular rocker member 100 pivoted for movement about a vertical pin 102. The side 104 of rocker member 100 is bent upwardly and has a slot 106 therein which receives a pin 107 fastened to the projecting lens 79, which passes through a slot 108 in the side of cylindrical bracket 78. The focusing shaft 96, rocker member 100, and the projector lens pin 107 are all so mounted and connected that rotation of the focusing shaft turns the rocker member about its pivot and thereby moves the projecting lens 79 along its optical axis to focus images of the picture carried by the slides. In use switch 51 is actuated to light the projection bulbs 52 and 52′. A slide carrier 63 or 63′ is inserted through slide slot 32 into guide slot 73. Slide turning shafts 85 and 85′ are pulled outwardly to permit insertion of the slide carriers and then are returned to normal position. A desired slide is rotated into the light beam path and focusing shaft 96 is turned to focus the image of the picture on the slide. The dentist selects a desired slide from both carriers 63 and 63′; for example, one picture showing a person wearing an old-style denture might be projected at the same time as a picture showing the same person wearing the more lifelike dentures recently developed. While the layman probably does not have enough knowledge of teeth to know which picture illustrates the person wearing the more lifelike dentures, he can tell that one picture presents a better over-all appearance for reasons that he cannot identify. He is thus able to make a meaningful selection of denture styles.

Other uses suggest themselves. The dentist might compare X-ray slides of the patient's teeth with X-rays taken at an earlier time, or with sample X-rays indicating some relatively rare defect which the dentist suspects the patient might have. In addition the dentist might use the device for his own instruction by using specially prepared slides sets which compare, for example, the right and the wrong ways of carrying out newly developed dental techniques.

FIGS. 7 and 8 illustrate a different embodiment of the invention. Slide turning shaft 185 has a flat elongated end 187 mounted in the slide carried guide slot 173. The associated slide carrier 163 has a radial slot 168 extending from its periphery to its center. Slot 168 is of the same width as the elongated shaft end 187. The slide carrier is inserted in the guide slot 173 and radial slot 168 is inserted over the elongated shaft end 187. Rotation of shaft 185 therefore turns slide carrier 163. Shaft 185 need not be axially moved to insert the slide carrier.

It will be apparent that a slide carrier has been provided which is compact enough in size to be used in a relatively crowded dental office and which can be viewed in a lighted room, without adversely affecting the person to person contact as would be the case if slides were projected in a darkened room. In addition, other activities can be carried on in the room at the same time. Any desired slide of a set can be compared with any other desired slide, and the device lends itself well to diagnosis, education of the patient, and study by the dentist, as well as many other uses which will occur to those skilled in other arts.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A projector for projecting side by side images of transparent picture slides comprising:
   (a) a cabinet,
   (b) screen viewing means in the cabinet for viewing from the exterior of the cabinet images projected on the screen's inner side,
   (c) at least two slide carrier means in the cabinet each holding a set of slides,
   (d) slide projecting means in the cabinet for projecting side by side images of one slide from each set on the inner surface of said screen,
   (e) independently operable slide selecting means associated with each set of slides for positioning any desired slide of the set in projecting position for viewing any slide in one set at the same time as any slide in the other set.

2. The apparatus of claim 1 including:
(a) two disks, each having a plurality of transparency slides arranged near the periphery of the disk at an equal radial distance from the disk center,
(b) bearing means mounted inside the cabinet and shaft means in the bearings mounting each disk for rotation independently of the other disk,
(c) separate control means located outside of the cabinet for rotating each disk independently of the other.

3. The structure of claim 2, in which each disk has a non-circular central opening and the turning means is a shaft with a portion shaped to fit within and mate with the non-circular opening.

4. The structure of claim 1, in which said viewing screen is arranged in a wall in the upper portion of the cabinet and each projector means includes the following items mounted in a line within the cabinet in the order stated:
(a) a light source,
(b) a condensing lens for directing light from the said source in a desired path,
(c) the slide carrier means and the selecting means being positioned so that a slide selected by the selecting means is in the said light beam path,
(d) a projecting lens having its optical axis substantially aligned with the said light beam path,
(e) means mounting the projecting lens for linear movement to a selected position along the light beam path, and
(f) reflecting means positioned to reflect the light beam and the image projected by the said lens to the said screen in a position side by side with the image projected by the adjacent slide projecting means.

5. The structure of claim 1, in which each projecting means includes a light source arranged to direct light in a path through the selected slide in the carrier means, a projecting lens, means mounting the projecting lens for linear movement in said light beam path between said slide carrier means and said viewing screen with its optical axis substantially aligned with said light beam path, a rocker member pivotally mounted within the cabinet for movement about an axis perpendicular to the said light beam path having a portion on one side of the pivot arranged to engage and move the projector lens along the light beam path, and a shaft mounted within the cabinet for rotation about an axis substantially parallel with the light beam path and having an arm extending from one side of the shaft arranged to engage and move a portion of the rocker member whereby rotation of the said shaft moves the projecting lens in the light beam path.

6. The structure of claim 1, in which the slide carrier means includes a laminated disk consisting of:
(a) two parallel flat transparent members, and
(b) a flat circular spacer member secured between the transparent members having peripheral openings of at least the same size as the associated slides which are overlaid by the transparent members on both sides to form slide receiving pockets.

7. The structure of claim 6 in which:
(1) the laminated disk has a non-circular opening therein, and
(2) the slide selecting means comprises:
(a) a shaft having a non-circular portion at the end thereof, and
(b) means mounting the said shaft within the cabinet for both axial movement and rotational movement about an axis substantially parallel to the light beam path,
(3) whereby the laminated disk can be positioned at the end of the shaft by axially moving the shaft, inserting the disk and returning the shaft to its original position with its non-circular portion engaging the mating non-circular opening in the disk, and the disk can thereafter be rotated by turning the shaft.

8. The structure of claim 1 in which:
(1) the slide carrier means is a circular disk having a plurality of slides arranged near its periphery at an equal radial distance from the disk's center,
(2) with a radial slot extending from the periphery to the center of the disk, and
(3) said slide selecting means comprises:
(a) a shaft having a flat portion of substantially the same width as the said radial slot in the disk, and
(b) means mounting the shaft within the cabinet for rotation about an axis substantially parallel to the projector light beam path.

References Cited

UNITED STATES PATENTS

| | | | |
|---|---|---|---|
| 320,392 | 6/1885 | Peterson et al. | 287—52 |
| 1,097,310 | 5/1914 | Genter | 88—27 |
| 1,218,928 | 3/1917 | Clement | 40—34 X |
| 1,925,671 | 9/1933 | Mansfield | 287—52 |
| 2,138,821 | 3/1938 | Potter | 88—27 |
| 2,369,483 | 2/1945 | Musebeck | 88—27 |

NORTON ANSHER, *Primary Examiner.*

WINDHAM M. FRYE, RICHARD M. SHEER,
*Assistant Examiners.*